INVENTORS
THOMAS M. LO CASALE
HUGH R. MOON

BY G. Donald Weber Jr.

ATTORNEY

United States Patent Office 3,391,286

Patented July 2, 1968

3,391,286

HIGH FREQUENCY PULSEFORMER

Thomas M. Lo Casale, Warminster, and Hugh R. Moon, Philadelphia, Pa., assignors to Sperry Rand Corporation, New York, N.Y., a corporation of Delaware Filed Oct. 19, 1965, Ser. No. 498,052
10 Claims. (Cl. 307—261)

ABSTRACT OF THE DISCLOSURE

A high frequency pulse-forming circuit is disclosed which includes a charge storage diode connected into the base circuit of a common collector transistor circuit. A sine wave input to the pulse-forming circuit causes the charge storage diode to develop a turn-on pulse for the transistor which has an abrupt leading edge. The turn-on pulse rapidly switches the transistor to a conducting state to thereby form the leading edge of an output pulse and at the same time produces a charge storage in the base-to-collector junction of the transistor. The leading edge of the pulse formed in the emitter circuit of the transistor is applied through a delay to the base circuit of a second transistor. The second transistor is connected in shunt to the output circuit of the pulse former. When the leading edge reaches the second transistor it turns the second transistor on to form the trailing edge of the output pulse. A part of the output current of the second transistor is fed back to the first transistor to rapidly clean up the charge stored therein and to render the circuit immediately responsive to the generation of the next pulse.

This invention relates to a high frequency pulseformer. More particularly, the pulseformer incorporates a charge storage diode in combination with a transistor circuit to provide signals having fast rise and fall times as well as predescribed duration and amplitude.

There are many types of pulseformers available in the art. Many of these pulseformers utilize storage diodes therein. Examples of such pulseformers are Pulse Generator, by Jack Saul Cubert, S.N. 270,578, now U.S. Patent 3,200,267 and High Frequency Pulse Generator, S.N. 152,338, now U.S. Patent 3,168,654 by Thomas K. Lewis assigned to the common assignee of this invention. These pulseformers, though adequate for many purposes, have a disadvantage that the pulses provided thereby are dependent on the operational characteristics of the storage diodes. The instant circuit while utilizing a storage diode in one portion thereof, utilizes a transistor network in conjunction therewith to provide a hybrid circuit which produces signals having high frequency components and wherein the duration and amplitude of the pulse produced by the circuit are not dependent upon operating characteristics of the components, per se.

This type of circuit which may be utilized in many electronic devices, for example high speed computing machines, has the storage diode portion thereof associated with the input thereby to control the leading edge of the signal which is being produced. Also, a transistor which exhibits charge storage properties in at least the collector-base junction is connected to the storage diode to assist in shaping the leading edge of the pulse. An additional transistor is connected, via a delay line, to the first transistor. The additional transistor is utilized to provide improved turn off control thereby to improve the trailing edge characteristics of the pulse produced by the circuit.

Consequently, it is one object of this invention to provide a high frequency pulseformer.

Another object of this invention is to provide a high frequency pulseformer wherein the pulses produced thereby have fast rise and fast fall times.

Another object of this invention is to provide a high frequency pulseformer for generating a pulse having fast rise and fall times as well as predescribed duration and amplitude.

Another object of this invention is to provide a high frequency pulseformer wherein the pulse produced thereby is a width which is independent of the snap off time of the storage diode.

These and other objects of this invention will become more readily apparent when the following description is read in conjunction with the drawings in which.

Figure 1:
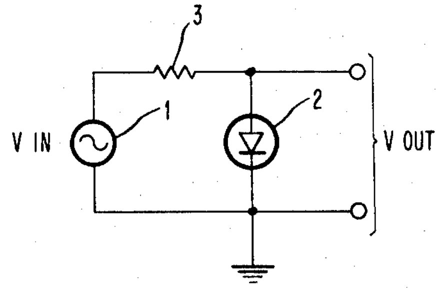
FIGURE 1 is a schematic diagram of the stored charge diode network.

Referring now to FIGURE 1, there is shown a schematic diagram of a typical charge storage diode network. This network is known in the art and no claim is made thereto, per se. However, it is deemed desirable to discuss this circuit in order to provide certain background for the instant invention.

In FIGURE 1, a voltage generator, for example a sinusoidal voltage generator 1 is connected in series with resistor 3. The series network is connected in parallel with storage diode 2 across which the output potential is obtained.

Figures 2, 3:
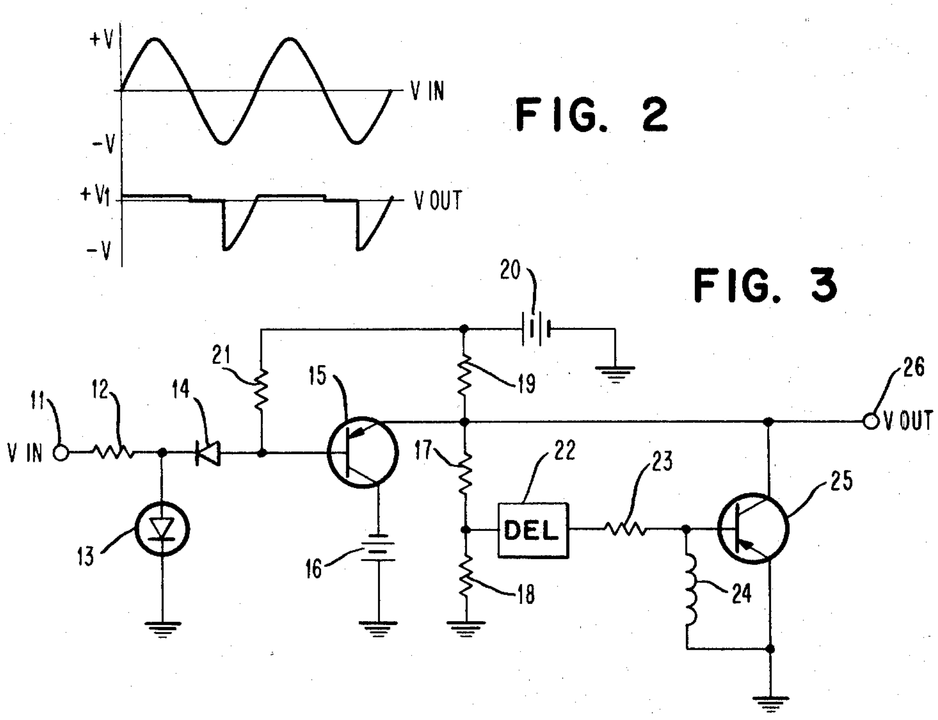
FIGURE 2 is a graphic diagram of the waveshapes generated in and by the circuit shown in FIGURE 1.
FIGURE 3 is a schematic diagram of a preferred embodiment of the instant invention.

The operation of the circuit shown in FIGURE 1 is more easily understood when FIGURE 2 is reviewed concurrently. Voltage generator 1 provides, for example, an alternating or sinusoidal voltage. The sinusoidal voltage has peak magnitudes of +V and −V. Thus, the input signal $V_{IN}$ is supplied by voltage generator 1 to storage diode 2. When the input signal supplied by generator 1 is positive, a positive potential is applied at the anode of storage diode 2. In this condition, storage diode 2 appears as a low impedance shunt whereby the only output detected is +V1 which is equivalent to the forward voltage drop across storage diode 2 in the forward direction. During the time when forward current exists in storage diode 2, charge is being stored in the lattice network thereof. This phenomenon is well known in the art. When the voltage applied by generator 1 switches to the negative going portion of the cycle, the voltage drop across storage diode 2 is somewhat reduced inasmuch as storage diode 2 has a very low reverse impedance inasmuch as the charge stored therein is being recombined or swept out of the lattice structure. In effect, the voltage directed across the output terminals falls to substantially ground potential in the embodiment shown.

Eventually, the charge which has been stored in the lattice network of storage diode 2 will be swept therefrom whereupon storage diode 2 operates as any normal rectifier diode. That is, storage diode 2 will exhibit an extremely large reverse impedance to the signal which applies a negative potential at the anode of the diode 2. Since storage diode 2 instantaneously exhibits an extremely high impedance and appears as an open circuit, the output voltage suddenly switches to the potential which is, at that time, being applied by generator 1. The output potential then follows the signal supplied by signal generator 1 until the potential becomes sufficiently positive to cause forward current flow through storage diode 2. At this time, the operation of the storage diode repeats the operation previously described. Thus, it is seen that this network can provide a relatively rapid leading edge to a signal. However, the trailing edge of the signal is neither sharply defined nor is it independent of the storage diode operation.

Although the network shown in FIGURE 1 is adequate for many applications, there are additional applications where a more sophisticated network is desired. Thus, the circuit shown in FIGURE 3 is utilized. Referring now to FIGURE 3, there is shown a schematic diagram of a preferred embodiment of the subject invention. Input terminal 11 is connected to an input signal source which may be any typical input signal source similar to voltage generator 1 shown in FIGURE 1. The input source provides, for example, an alternating signal such as shown in FIGURE 2 and having a peak magnitude of ±4 volts. Input terminal 11 is connected via coupling resistor 12 to the anode of storage diode 13. The cathode of storage diode 13 is connected to a suitable reference potential, for example ground. Storage diode 13 functions to shape the input signal into a +1.0 to −4.0 volt signal along the lines shown by FIGURE 2. Also, the anode of storage diode 13 is connected to the cathode of coupling diode 14. Coupling diode 14 is a typical high speed rectifier diode (for example ID5–050) capable of only unilateral conduction from anode to cathode. The anode of coupling diode 14 is connected to the base electrode of transistor 15. The collector electrode of transistor 15 is connected to a suitable reference potential such as indicated generally by battery 16. In the configuration shown, the reference potential supplied to the collector electrode of transistor 15 is a negative potential, for example on the order of −3.0 volts. The emitter electrode of transistor 15 is connected to one terminal of resistor 19. Another terminal of resistor 19 is connected to one terminal of resistor 21. Another terminal of resistor 21 is connected to the base of the transistor 15. One terminal of a potential source, shown schematically as battery 20, is connected to the junction between resistors 19 and 21. In the embodiment shown, the potential supplied by battery 20 is positive with respect to ground and has a magnitude of approximately +20 volts. The resistors 19 and 21 provide circuit paths whereby bias potential is applied at the electrodes of transistor 15. In the suggested embodiment, resistor 21 may be about 20,000 ohms while resistor 19 may be on the order of 7,500 ohms. Also, the potentials supplied by the bias source tend to provide bias potentials of about +1.0 volt at the base and emitter electrodes.

In the preferred embodiment, transistor 15 is a silicon PNP transistor having a diffused collector to base junction. The base-to-collector junction, like the storage diode, stores charge therein during forward current flow therethrough.

In addition to the output terminal 26, there is connected to the emitter electrode one terminal of resistor 17. A resistor 18 is connected between a suitable reference potential, for example ground, and another terminal of resistor 17. Each of resistors 17 and 18 is 100 ohms for example. The series connection of resistors 17 and 18 and 19 provides a voltage divider network. This network provides the bias potentials at the emitter electrode of transistor 15 (described supra) and, ultimately at the base electrode of transistor 25. At the junction of the resistor 17 and 18, there is connected one terminal of delay device 22. The delay device provides a delay on the order of about 15 nanoseconds in the preferred embodiment. Of course, the delay period of delay device 22 may vary in different embodiments. However, the delay period is typically of the order of slightly more than one quarter of the time period for a cycle of the input signal source. More specifically, delay device 22 is determined to be of at least the same duration as the signal which is passed by the storage diode 13 output signal shown in FIGURE 2, as will become more readily apparent hereinafter. Another terminal of delay device 22 is connected, via 100 ohms resistor 23, to the base of transistor 25. The collector electrode of transistor 25 is connected to the output terminal 26 as well as to the emitter electrode of transistor 15. The emitter electrode of transistor 25 is connected to a suitable potential source for example ground. Transistor 25 is, typically, a high frequency germanium transistor, ZN964 for example. An inductor 24 is shown connected in parallel with the base-emitter diode of transistor 25 thus having one terminal connected to the base of transistor 25 and another terminal connected to a suitable potential source for example ground. Inductor 24 aids in speeding up the turn off of transistor 25. However, the inductor may be omitted where not essential.

Figure 4:
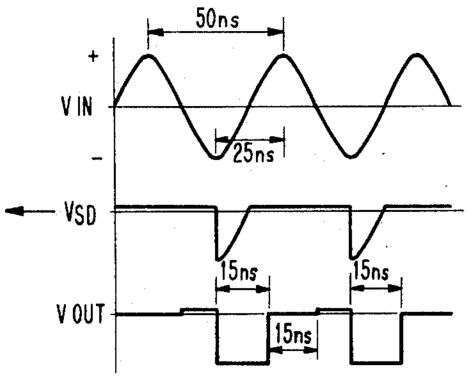
FIGURE 4 is a graphic diagram of the waveshapes generated in and by the circuit shown in FIGURE 3.

The operation of the circuit shown in FIGURE 3 is more readily understood when the timing diagram shown in FIGURE 4 is considered concurrently. The input signal supplied at input terminal 11 has a substantially sinusoidal configuration (although not limited thereto) with a peak to peak value of ±V. In the suggested environment, the input signal may have a frequency of 20 megacycles per second or a cycle time of 50 nanoseconds. This signal is suppiled via coupling resistor 12 to storage diode 13. The storage diode 13 produces the output signal $V_{SD}$ which is similar to the operation shown in FIGURE 2. With the typical parameters suggested, storage diode 13 produces a signal $+V_1$ of approximately +0.7 volt base potential and a negative signal −V of approximately −4.0 volts. The signal translated via diode 13 is applied to the cathode of rectifier diode 14. When the negative pulse is applied, rectifier diode 14 conducts.

When the negative signal is applied, and rectifier diode 14 becomes conductive, the potential at the base of transistor 15 switches from +1.0 volt (the bias potential supplied via resistor 21, diode 14 and diode 13 to ground) toward −4.0 volts, and turns on transistor 15. However, the base clamps at approximately −3.6 volts. That is, a potential of −3.0 volts is supplied to the collector electrode of transistor 15 and a potential drop of about 0.6 volt exists across the collector-base junction. Consequently, as noted, transistor 15 is turned on. The turning on of transistor 15 causes current conduction in the collector-base junction whereby, charge is stored therein. In addition, the emitter electrode switches from the bias potential of approximately +1.0 volt (supplied via resistor 19) to a potential of approximately −3.0 volts as supplied at the collector electrode. The output signal, detected at output terminal 26, clearly exhibits a potential switch from +1.0 volt to −3.0 volts as is dictated by the operation of the emitter electrode of transistor 15.

Also, this negative going pulse is supplied, via resistor 17 to delay device 22. Delay device 22 delays the application of the negative signal to the base of transistor 25 for approximately 15 nanoseconds in the embodiment described. In the meantime, since the diffused collector-base junction of transistor 15 has had charge stored therein by the passage of forward current therethrough, the output signal at terminal 26 remains substantially flat inasmuch as reverse current through the collector to base junction of transistor 15 does not change the collector potential while charge is still stored in this junction. This special reverse current sustains the output signal at the substantially −3.0 volts potential despite the fact that the potential supplied to the cathode of rectifier diode 14 has changed to a higher potential. That is, diode 14, being a high speed diode, becomes a high impedance while the collector base junction is discharging the stored charge.

Subsequently, after the 15 nanosecond delay, the negative signal is applied to the base of transistor 25 via coupling resistor 23. The application of the negative going signal to the base of transistor 25 turns transistor 25 to the on or conductive state and causes the output terminal 26 to rise to essentially ground potential to thereby form the trailing edge of the output pulse. Since transistor 25 provides an output current or collector current which is amplified by the $\beta$ factor times the base current, (i.e. $I_c=BI_B$) a large current is supplied to terminal 26 as well as to the emitter electrode of transistor 15.

As noted from FIGURE 3, when transistor 25 turns on, the large collector current $I_c$ initially flows through the base emitter diode of transistor 15 and directly into the collector base junction. This occurs because, as described above, the base of transistor 15 has already become a high impedance due to the back biased diode 14. The current through the base emitter diode is then used to sweep out the charge stored in the collector-base junction. When the charge is depleted the potential at the base is no longer held near −3.0 volts and it switches rapidly toward +1.0 volt as dictated by the bias network including source 20, resistor 21 and diodes 14 and 13. As the base potential rises toward +1.0 volt the emitter and, therefore, the output will follow. It will be noted however that in the interval between the generation of the trailing edge and before transistor 15 cleans up, the potential at the output terminal 26 will be held at ground until transistor 25 is turned off.

Transistor 25 does presently turn off since the positive transition at the emitter of transistor 15 generates a positive turn off pulse along delay element 22 in the same manner that the negative turn on pulse was applied. Thus the potential at output terminal 26 can remain at ground for as long as one delay time period (i.e. 15 ns.) and then rises toward nominal +1.0 volt in preparation for the next pulse sequence. Thus the signal supplied by transistor 25 serves both to provide the trailing edge for the output signal and to rapidly switch transistor 15 from saturation to cut off.

In a preferred embodiment, the inductor 24 aids in the turn off characteristic of transistor 25 by charging and discharging energy with the change of respective signals at the base of a transistor. This also serves to shorten the length of time during which the output remains at ground level before rising to +1.0 v.

From the foregoing description, it will be understood that various changes may be made in the form, construction and arrangement of the parts, without departing from the scope of the invention, the form hereinbefore describing merely a preferred embodiment.

The embodiments of the invention in which an exclusive property or privilege is claimed are defined as follows:

1. In combination, input means, charge storage diode means connected in parallel with said input means, first transistor means, said charge storage diode means selectively permitting signals from said input means to be applied to said first transistor means, output means connected to said first transistor means, second transistor means connected to said output means, and delay means connected from the connection of said first transistor means and said output means to said second transistor means

2. In combination, input means for supplying an alternating polarity signal, charge storage diode means connected in parallel with said input means, first transistor means, said charge storage diode means selectively permitting signals from said input means to be applied to said first transistor means after the stored charge has been swept therefrom, output means connected to said first transistor means, second transistor means connected to said output means, delay means connected from said output means to said second transistor means, and bias means connected to said first transistor means to control the potential at said output means.

3. The combination recited in claim 2, wherein said first transistor means includes one junction exhibiting charge storage characteristics, and rectifier diode means connected between said charge storage diode means and said first transistor means to pass only signals of one polarity from said charge storage diode to said first transistor.

4. In combination, input signal means, charge storage diode means connected in parallel with said input signal means, first PNP transistor means having base, emitter and collector electrodes, means connecting said collector electrode to a source of reference potential, said charge storage diode means selectively permitting signals from said input signal means to be applied to the base electrode of said first transistor means, output means connected to the emitter electrode of said first transistor means, second PNP transistor means having base, emitter and collector electrodes, means connecting the emitter electrode of said second PNP transistor to a source of reference potential, said output means connected to the collector electrode of said second transistor means, and delay means connected from the connection of said first transistor means emitter and said output means to the base electrode of said second transistor means.

5. The combination recited in claim 4 including a voltage divider network connected between the emitter electrode of said first transistor means and said delay means.

6. The combination recited in claim 4 including bias means connected to said base and emitter electrodes of said first transistor means.

7. The combination recited in claim 4 including reactive means connected between the base and emitter electrodes of said second transistor means.

8. The combination recited in claim 4 including rectifier diode means connected between said charge storage diode means and said base electrode of said first transistor means.

9. The combination recited in claim 4 wherein the base-collector junction of said first transistor means exhibits charge storage characteristics.

10. A pulse former comprising, an input means including a charge storage diode, said input means being adapted to receive a triggering signal and further being adapted to develop from the triggering signal a pulse having an abrupt leading edge, a first transistor having an input and an output associated therewith, biasing means coupled to said first transistor for normally biasing said transistor to a nonconducting state, means feeding the pulse developed by said input means to the input of said first transistor thereby to render said first transistor conducting and to store a charge therein, a second transistor having an input and an output, said second transistor having its output connected in shunt to the output of said first transistor, means holding said second transistor in a normally nonconducting state, and delay means coupling the output of said first transistor to the input of said second transistor to render said second transistor conducting after a period corresponding to the delay of said delay means whereby a pulse is formed in the output of said first transistor having a leading edge corresponding to the initiation of conduction in said first transistor and a trailing edge corresponding to the initiation of conduction in the second transistor.

References Cited

UNITED STATES PATENTS 3,181,012 4/1965 Rennie ---------- 307—88.5

ARTHUR GAUSS, *Primary Examiner.*

J. ZAZWORSKY, *Assistant Examiner.*